J. I. LYLE.
THERMAL INTERCHANGING APPARATUS.
APPLICATION FILED OCT. 19, 1910.
1,082,539.
Patented Dec. 30, 1913.
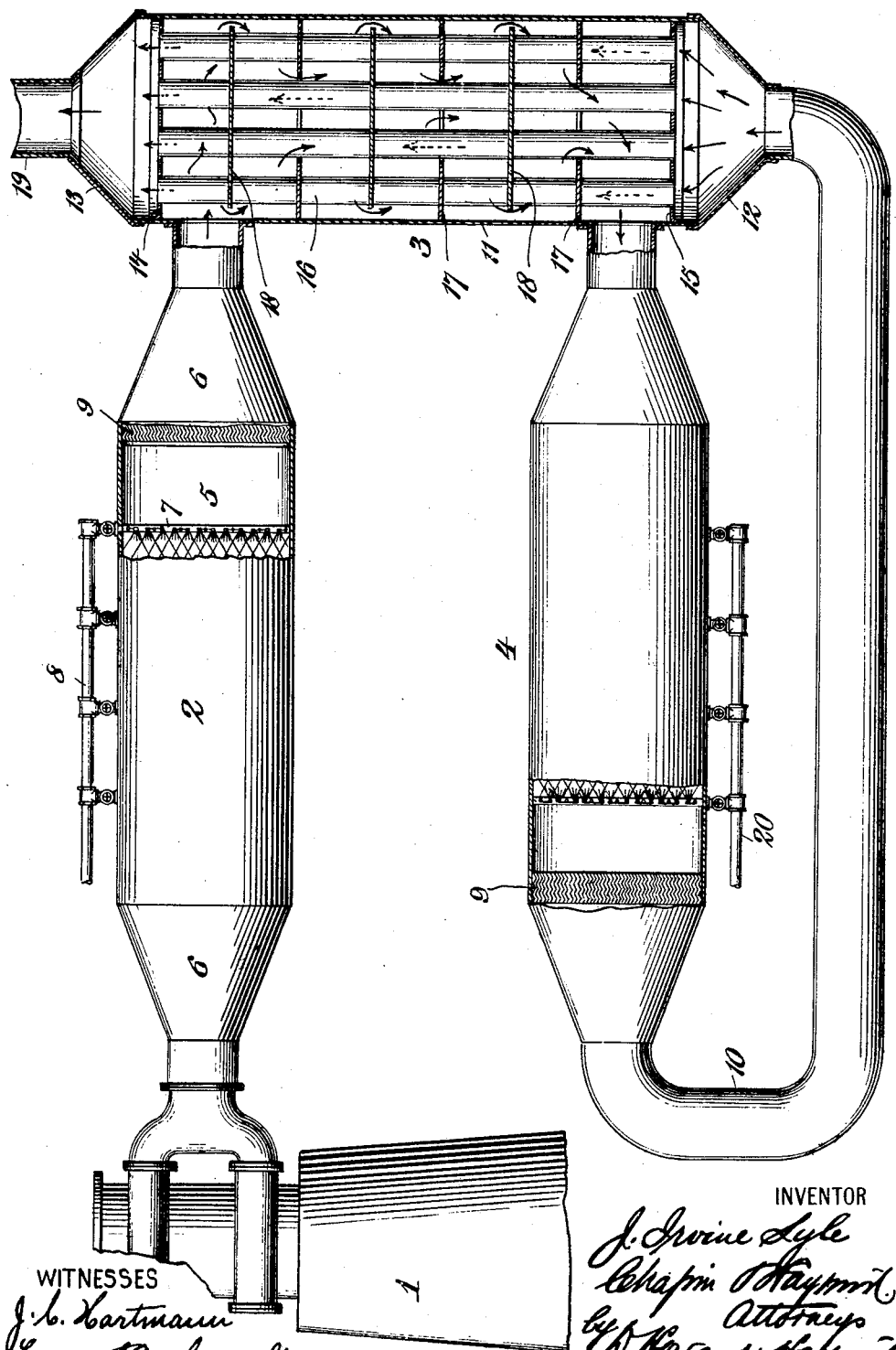
WITNESSES
INVENTOR

UNITED STATES PATENT OFFICE.

JOEL IRVINE LYLE, OF PLAINFIELD, NEW JERSEY.

THERMAL INTERCHANGING APPARATUS.

1,082,539.   Specification of Letters Patent.   Patented Dec. 30, 1913.

Application filed October 19, 1910. Serial No. 587,826.

*To all whom it may concern:*

Be it known that I, JOEL IRVINE LYLE, a citizen of the United States of America, and a resident of Plainfield, county of Union, and State of New Jersey, have invented certain new and useful Improvements in Thermal Interchanging Apparatus, of which the following is a specification, reference being had to the accompanying drawings, forming a part thereof.

My invention relates to apparatus for regulating the moisture content of air and particularly air under pressure, by reducing the temperature of the air to the point at which when saturated it will contain the required amount of moisture per cubic foot of space occupied, and the main object of my invention is to decrease the cost of carrying out such an operation.

Such an apparatus is useful in many relations and particularly in connection with air supplied in metallurgical processes. For use in such processes it is always desirable that the air be supplied at a high temperature, hence it is immaterial to what extent the temperature of the air be raised after the moisture content has been determined therein, it being understood that it is necessary to reduce the temperature of the air at some point in the process to which this invention relates, to a relatively low degree, in order that such moisture content be fixed at the required amount, because it is at such a low degree that fully saturated air will carry just the required amount of moisture.

I avail myself of the foregoing by utilizing the air, after it has been reduced as required to the necessary low temperature, for the purpose of absorbing heat from the incoming air and by this means I reduce the amount of refrigerating fluid required for the final cooling step.

To effect the foregoing I conveniently employ a counter-current apparatus in which incoming air is delivered in one direction through one part of the apparatus to the refrigerating means, the refrigerated air being delivered back through another part of the counter-current apparatus, along channels in close proximity to the path of incoming air, the incoming and return air preferably passing in opposite directions, whereby a thermal interchange will be effected as will be well understood.

In order that my invention may be thoroughly understood, I will now proceed to describe an apparatus constituting an embodiment thereof, having reference to the accompanying drawing which illustrates in partial side elevation and partial central vertical longitudinal section an apparatus constructed in accordance with my invention.

The apparatus comprises, in general, a blowing engine 1, a fore-cooler 2, a counter-current apparatus 3, and a dew-point cooler
4. The fore-cooler 2 is here shown in the form of a tubular chamber 5 having conical ends 6 one of which connects directly with the blowing engine and constitutes the inlet end, while the other end connects with the counter-current apparatus and constitutes the discharge end of the fore-cooler. Located in the central chamber thereof are a plurality of pipes 7 provided with spraying nozzles, the said pipes forming branch connections from a main supply pipe 8, and near the discharge end of the fore-cooler, conveniently in the immediate proximity of the front conical portion 6, are a series of eliminator plates 9. The dew-point cooler 4 is similar in construction and arrangement to the fore-cooler except that it is shown as reversely disposed with respect to the fore-cooler, that is to say, its inlet end connects with the counter-current apparatus.
The opposite or discharge end thereof connects with a pipe 10 which leads around to the bottom of the counter-current apparatus and connects with the tubes constituting the return channel thereof as will presently appear. The dew-point cooler has an independent supply pipe 20 for the admission of water which has been artificially cooled, and I apply the term "dew-point cooler" to this part of the apparatus because it is therein that I reduce the temperature of the air to the required temperature at the "dew-point" or point of complete saturation whereof, the desired amount of moisture is obtained. The counter-current apparatus comprises a tubular shell 11 having conical upper and lower heads 12—13. In proximity to the said upper and lower heads are upper and lower diaphragms 14 and 15 which serve as supports for a plurality of vertical tubes 16, and intermediate the said upper and lower diaphragms 14 and 15 are a plurality of alternately disposed baffle plates 17—18, the former having central openings and the latter having openings between the edges thereof and the outer shell walls. The lower head 12 of the counter-current apparatus connects with the discharge end of the pipe of conduit 10 while the upper head 13 connects with a delivery pipe or conduit 19. The fore-cooler and dew-point cooler connect respectively with the upper and lower ends of the shell portion of the counter-current apparatus, as shown, so that the fore-cooler delivers into the shell of the counter-current apparatus, at the upper end thereof, around the vertical tubes therein, while the counter-current apparatus delivers from the lower end of its shell portion to the dew-point cooler.

The apparatus may be employed as follows: Atmospheric air, compressed by the blowing engine 1 is delivered in its compressed condition to the fore-cooler. The air is of course heated in the process of compression in the blowing engine and is delivered directly in its heated condition to the fore-cooler. While in the fore-cooler it is subjected to a series of sprays of cold water delivered from the supply pipe 8 through the nozzles in the branches 7. Assuming that the blowing engine compresses the air to from 10 to 20 pounds pressure above the pressure of the atmosphere, the compressed air will be delivered to the fore-cooler at a temperature, say, from 175 to 190 degrees Fahrenheit. The water admitted to the fore-cooler may be artesian or other well water, river water, city water, or other water available from natural sources and being at about atmospheric temperature. While in the winter time the temperature of this water may be quite low, its temperature in the summer may readily rise up to, say, 80 degrees, so that assuming a temperature of 80 degrees, the air passing through the fore-cooler may be readily reduced by the action of the water to, say, about 85 degrees. The eliminator plates 9 will remove any entrained particles of water, i. e., free water which is not contained in the air in a state of vapor. The partially cooled air under pressure will now be delivered to the shell portion of the counter-current apparatus and will descend therethrough downward around the vertical tubes 16 and will be delivered therefrom to the dew-point cooler 4. In this cooler artificially cooled water will be admitted through the supply pipe 20 therein provided, the temperature at which the water is admitted being governed first, by the temperature to which the air is cooled in the fore-cooler, and second, by the temperature to which it is desired to reduce the air in the dew-point cooler. Assuming that the air is delivered to the dew-point cooler at, say, 75 degrees (it being presently shown that a reduction of the temperature of the air delivered from the fore-cooler takes place in the counter-current apparatus 3, which may be assumed to be, say, 10 degrees), and that the desired temperature to which the air is to be reduced in the dew-point cooler is, say, 50 degrees, the artificially cooled water admitted to the dew-point cooler may be at a temperature of, say, 37 degrees. The air passing through the dew-point cooler and subjected therein to the direct action of the water at such a low temperature will be cooled to the desired temperature of 50 degrees and completely saturated, a set of eliminator plates 9 again entrapping any free water and restraining the same from being carried along with the air, whereby the air will be delivered, at substantially the initial pressure and at the temperature of, say, 50 degrees, in a fully saturated condition, to the pipe 10. Thence the air will travel to the lower head 12 of the counter-current apparatus and up through the tubes 16 of the counter-current apparatus. In the passage of the air through the tubes it will absorb heat from the descending currents of air around the pipes so as to reduce the temperature thereof to the extent of, say, 10 degrees, i. e. from 85 degrees to 75 degrees, such as has been above referred to. In taking on this heat the temperature of air rising through the tubes will be raised from, say, 50 degrees to, say, 70 degrees, so that it will be delivered to the delivery pipe 19 at 70 degrees temperature. After leaving the dew-point cooler, however, the amount of moisture therein will remain fixed and as the apparatus is designed for the purpose of determining the quantity of moisture contained in the air regardless of its temperature, this rise of temperature will be immaterial; in fact it will be advantageous because in the final disposition of the air the temperature is generally raised to a considerably higher degree, moisture being carefully excluded, however, so as to retain the moisture content uniform.

From the foregoing it will be apparent that a considerable economy of operation is obtained by use of this process and apparatus. The cooling in the fore-cooler is quite inexpensive because it is accomplished by water from natural or inexpensive sources, and in any event it is a reduction in temperature only down to a point not lower than ordinary atmospheric temperatures.

In the use of the counter-current apparatus a considerable saving is effected in the quantity of artificially cooled water necessary to be employed in the dew-point cooler, because of the reduction of the temperature, during its passage through the counter-current apparatus, of the air to be cooled, by reason of the interchange of heat units therefrom to the air which has been cooled, and the temperature of which, once the moisture content thereof has been determined, is no longer material.

It will be understood that it is necessary in the work for which this apparatus was designed to carry the temperature of the air down below the normal atmospheric temperature in order to bring it to the point wherein the air when fully saturated will contain the required amount of moisture, and no more.

It will of course be understood that in winter, for instance, when the water supplied to the fore-cooler is at a sufficiently low temperature, it may not be necessary to introduce artificially cooled water in the dew-point cooler at all, and in this case the supply pipe 20 for the dew-point cooler may be closed and the air simply caused to circulate therethrough. By this means the apparatus may be used under all conditions without substantial change, the amount of artificially cooled water supplied to the dew-point cooler varying from nothing up to the extent required to produce the proper temperature at the delivery end thereof.

In reciting the foregoing temperatures and pressures it will of course be understood that they are merely used for purposes of illustration and that they may and will vary largely under working conditions. They will of course vary for many reasons and from many causes, among which are the temperature of the water supplied, the temperature of the incoming air, the temperature required for the outgoing air, and variations in efficiency of the apparatus due to the relative sizes and construction of the parts and the more or less efficient insulation thereof.

What I claim is:

1. An apparatus of the class described, comprising a fore-cooler, a heat interchanger and a dew-point cooler, said heat interchanger comprising a shell, heads secured at each end of said shell, a diaphragm secured at each end of said shell thus forming an inclosed space within said shell and a plurality of tubes disposed within the inclosed space of said shell and supported by said diaphragms, said tubes opening into the space surrounded by said heads, the discharge end of said fore-cooler being connected with the inclosed space of said shell near the upper of said diaphragms and the inlet end of said dew-point cooler being connected with the inclosed space of said shell near the lower of said diaphragms.

2. An apparatus of the class described, comprising a fore-cooler, a heat interchanger and a dew-point cooler, said heat interchanger comprising a shell, heads secured at each end of said shell, a diaphragm secured at each end of said shell thus forming an inclosed space within said shell, a plurality of tubes disposed within the inclosed space of said shell and supported by said diaphragms, said tubes opening into the space surrounded by said heads, the discharge end of said fore-cooler being connected with the inclosed space of said shell near the upper of said diaphragms and the inlet end of said dew-point cooler being connected with the inclosed space of said shell near the lower of said diaphragms and a connection between the discharge end of said dew-point cooler and the head of said shell nearest said lower diaphragm.

3. An apparatus of the class described, comprising means for compressing air, a fore-cooler having its inlet end connected with said means, a heat interchanger and a dew-point cooler, said heat interchanger comprising a shell, heads secured at each end of said shell, a diaphragm secured at each end of said shell thus forming an inclosed space within said shell and a plurality of tubes disposed within the inclosed space of said shell and supported by said diaphragms, said tubes opening into the space surrounded by said heads, the discharge end of said fore-cooler being connected with the inclosed space of said shell near the upper of said diaphragms and the inlet end of said dew-point cooler being connected with the inclosed space of said shell near the lower of said diaphragms.

4. An apparatus of the class described, comprising a fore-cooler, a heat interchanger and a dew-point cooler, eliminator plates near the discharge end of said fore-cooler and said dew-point cooler, said heat interchanger comprising a shell, heads secured at each end of said shell, a diaphragm secured at each end of said shell thus forming an inclosed space within said shell and a plurality of tubes disposed within the inclosed space of said shell and supported by said diaphragms, said tubes opening into the space surrounded by said heads, the discharge end of said fore-cooler being connected with the inclosed space of said shell near the upper of said diaphragms and the inlet end of said dew-point cooler being connected with the inclosed space of said shell near the lower of said diaphragms.

5. An apparatus of the class described, comprising a fore-cooler, a heat interchanger and a dew-point cooler, means for supplying previously refrigerated fluid to said fore-cooler and said dew-point cooler, eliminator plates near the discharge end of said fore-cooler and said dew-point cooler, said heat interchanger comprising a shell, heads secured at each end of said shell, a diaphragm secured at each end of said shell thus forming an inclosed space within said shell and a plurality of tubes disposed within the inclosed space of said shell and supported by said diaphragms, said tubes opening into the space surrounded by said heads, the discharge end of said fore-cooler being connected with the inclosed space of said shell near the upper of said diaphragms and the inlet end of said dew-point cooler being connected with the inclosed space of said shell near the lower of said diaphragms.

6. An apparatus of the class described, comprising a fore-cooler, a heat interchanger and a dew-point cooler, said heat interchanger comprising a shell, heads secured at each end of said shell, a diaphragm secured at each end of said shell thus forming an inclosed space within said shell, a plurality of tubes disposed within the inclosed space of said shell and supported by said diaphragms, said tubes opening into the space surrounded by said heads and baffle plates disposed within the inclosed space of said shell and surrounding said plurality of tubes, the discharge end of said fore-cooler being connected with the inclosed space of said shell near the upper of said diaphragms and the inlet end of said dew-point cooler being connected with the inclosed space of said shell near the lower of said diaphragms.

J. IRVINE LYLE.

Witnesses:
D. HOWARD HAYWOOD,
LYMAN S. ANDREWS, Jr.